United States Patent [19]

Monpetit

[11] 4,262,334
[45] Apr. 14, 1981

[54] DIGITAL ADVANCE CONTROL DEVICE FOR INTERNAL COMBUSTION ENGINES

[75] Inventor: Louis Monpetit, Pommier-Foncquevillers, France

[73] Assignee: Agence Nationale de Valorisation de la Recherche (ANVAR), Neuilly-sur-Seine, France

[21] Appl. No.: 880,084

[22] Filed: Feb. 22, 1978

[30] Foreign Application Priority Data

Feb. 25, 1977 [FR] France .................. 77 05561

[51] Int. Cl.³ ............................................. F02P 5/04
[52] U.S. Cl. .................................. 364/431; 123/480; 123/417; 123/486; 123/487
[58] Field of Search ............... 364/424, 425, 431, 442; 123/32 EA, 32 EH, 117 D, 117 R

[56] References Cited

U.S. PATENT DOCUMENTS

| 3,906,207 | 9/1975 | Rivere et al. | 364/425 |
|---|---|---|---|
| 4,018,197 | 4/1977 | Salvay | 123/117 D |
| 4,036,190 | 7/1977 | Bigliani et al. | 123/117 D |
| 4,052,967 | 10/1977 | Colling et al. | 123/117 D |
| 4,063,539 | 12/1977 | Gorille et al. | 123/117 D |
| 4,114,573 | 9/1978 | Mori | 123/117 D |
| 4,126,107 | 11/1978 | Harada et al. | 123/32 EH |
| 4,127,091 | 11/1978 | Léichlé | 364/431 |
| 4,175,507 | 11/1979 | Kawai et al. | 123/117 D |
| 4,190,027 | 2/1980 | Inui et al. | 123/117 D X |

FOREIGN PATENT DOCUMENTS 2164732  8/1973  France .
2165640  8/1973  France .

Primary Examiner—Felix D. Gruber
Attorney, Agent, or Firm—Darby & Darby

[57] ABSTRACT

A digital advance control system of the type including a digital computer which receives input data of various engine operating parameters including the number of pulses corresponding to the ignition angle from a tachometer device in which the data from the tachometer device is to be interpolated. The data to be interpolated is applied to an attenuator circuit which includes a subtracter which receives the higher order bits of the data and a reversible counter whose higher order bits are also applied to the subtracter. The output of the subtracter is applied to a preselection counter or a binary rate multiplier which controls the application of clock pulses to the reversible counter.

7 Claims, 5 Drawing Figures

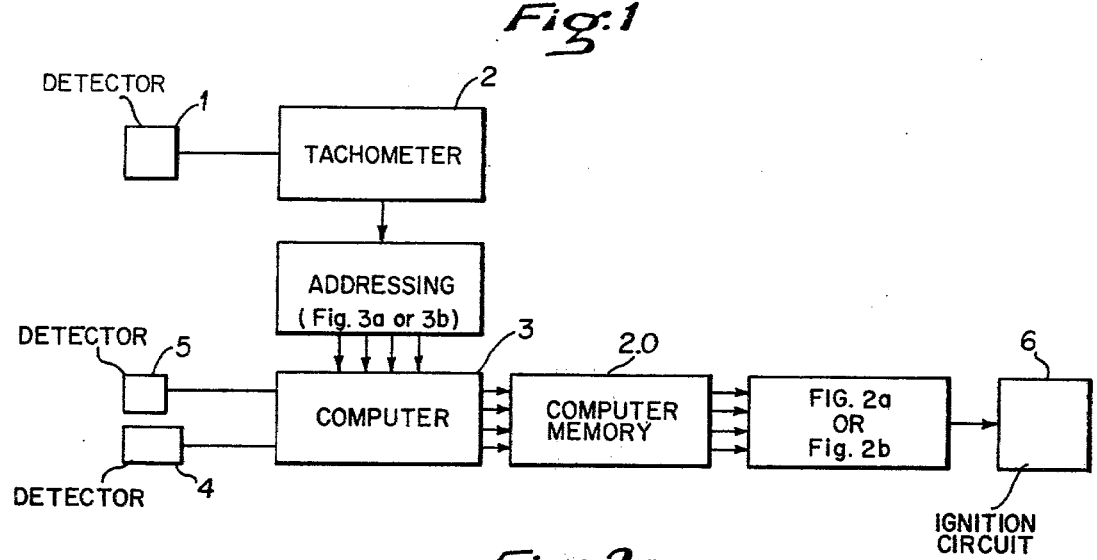
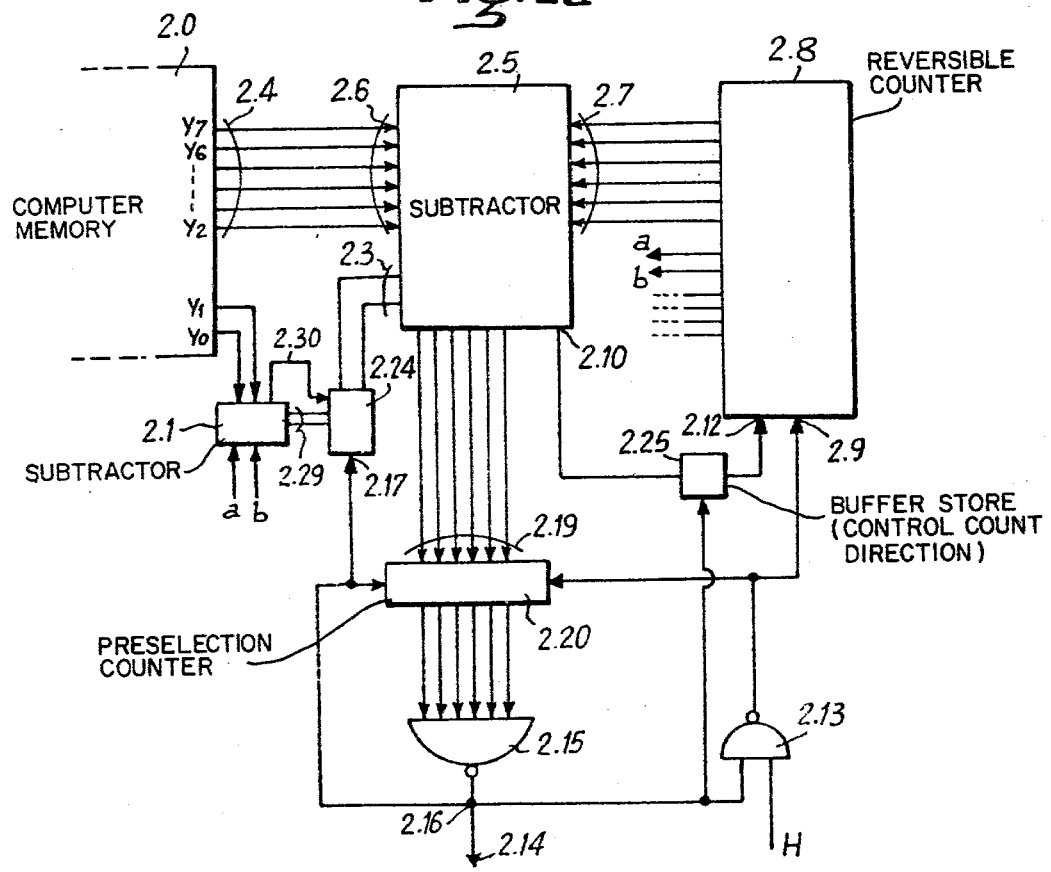

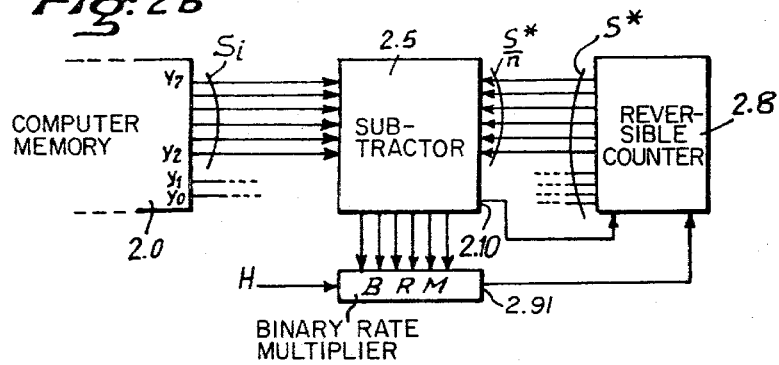
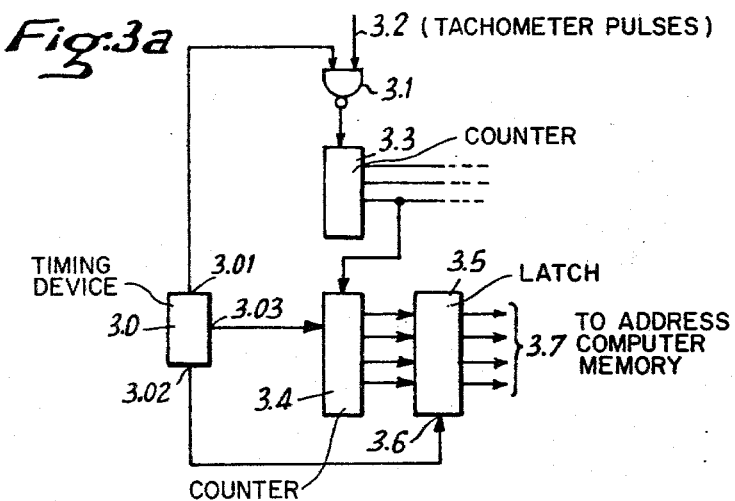
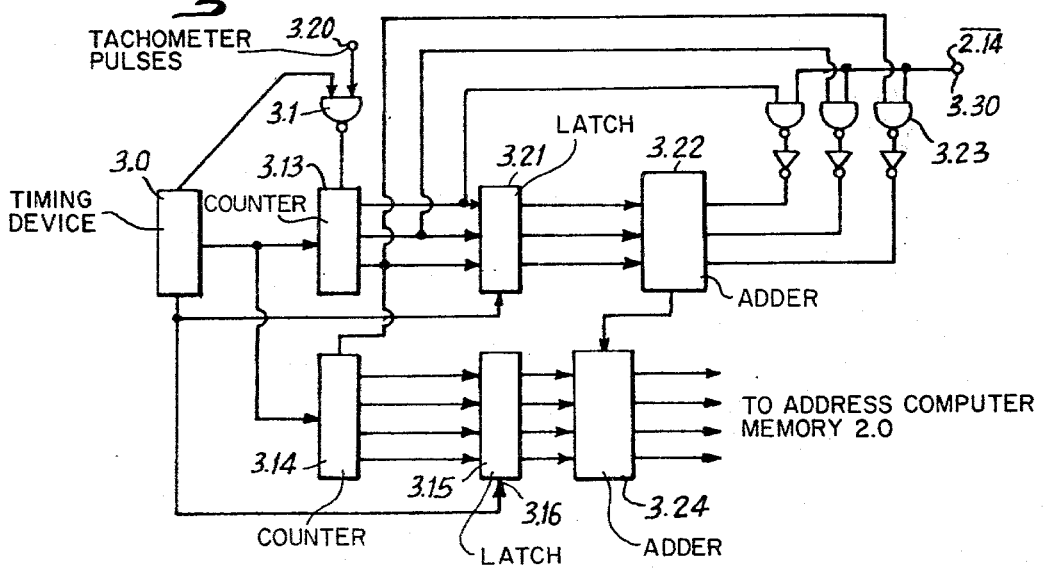

DIGITAL ADVANCE CONTROL DEVICE FOR INTERNAL COMBUSTION ENGINES

The invention relates to a digital advance control device for internal combustion engines.

It is known to control the ignition of an engine with the aid of a tachometer device delivering pulses at a frequency which is a multiple of that of the signals received from a detector, which for example detects the passing of a reference mark connected to the crankshaft of the engine. One such device is described in U.S. Pat. No. 3,946,709. The device of the patent effects correspondence between a number of pulses and an angular displacement to define the ignition advance angle in dependence on engine speed.

The invention seeks to control this ignition angle in dependence on a number of parameters and by a purely digital method.

It has as its object a digital advance control device for internal combustion engines, of the type in which a tachometer device delivers pulses at a frequency which is a multiple of that of the signals recieved from a detector, characterized in that it comprises in addition a digital computer receiving signals representing operational parameters of the engine, proceeding by interpolation to determine the number of pulses evolving at the interpolation frequency, originating from the tachometer device, corresponding to the ignition angle.

In addition, the invention has the following characteristics.

Downstream of the output matrix of the computer, a variable attenuation circuit is provided which includes a subtracter, a reversible counter, and a preselection counter. The matrix of the computer and the reversible counter supply the subtracter (each at one input) with the high order bits of their output numbers, and the result of the subtraction is transmitted to the preselection counter, while the reversible counter is fed with clock pulses in dependence on this result.

The bits of lower order of the output numbers of the matrix and of the reversible counter are compared in a second subtracter which supplies numerical signals defining a number and a sign to a circuit which carries over to the said subtracter the borrows in dependence on their sign.

The preselection counter receives the clock pulses and delivers a pulse every time it has completed its counting.

Downstream of its matrix the computer contains an attenuation circuit including a subtracter, a reversible counter, and a multiplier in binary code, the subtracter receiving the bits of higher order of the output numbers of the matrix and of the reversible counter and addressing to the multiplier the result of the subtraction, while the multiplier receives clock pulses and feeds the reversible counter.

Upstream of its matrix the computer contains an addressing circuit formed by two adders, or which one determines the borrows and transmits them to the other, which addresses to the matrix, at the interpolation frequency, a number composed of the sum of the most significant bits of the numbers measured at the input and any borrows.

The first adder receives on the one hand the least significant bits of the numbers measured at the input, and on the other hand a random number.

The random number being composed of the said least significant bits.

The pulse transmitted by the preselection counter is applied to the addressing circuit in order to trigger the interpolation.

The invention also has as an object the application of the device to the determination of the ignition advance in controlled ignition engines and to the determination of injection advance in diesel engines.

Other characteristics of the invention will be clear from the following description, which is given with reference to the accompanying drawing, in which:

FIG. 1 is a simplified symbolical diagram of the control device according to the invention;

FIG. 2a is a simplified symbolical diagram of a circuit disposed downstream of the memory of the computer in order to effect the variable attenuation of the weight of the transmissions of addresses;

FIG. 2b is a simplified symbolical diagram of a modification of the circuit shown in FIG. 2a, utilising a pulse multiplier;

FIG. 3a is a simplified symbolical diagram of a circuit of known type which is disposed upstream of the calculator, illustrating the method of carry-over of remainders;

FIG. 3b is a symbolical diagram of a modification according to the invention of the circuit shown in FIG. 3a.

Referring to FIG. 1, it is seen that the device according to the invention is composed essentially of an engine speed detector 1 supplying a pulse every time a reference mark, connected for example to the crankshaft, is passed.

The tachometer device 2 is for example of the type described in U.S. Pat. No. 3,946,709. It supplies pulses at a frequency which is a multiple (for example of the order of two thousand times) that of the signals of the detector 1.

The computer 3, which for example is of the type described in U.S. Pat. Nos. 3,904,856 or 3,953,715, receives not only the pulses of the tachometer device 2 but also the signals of detectors 4 and 5 corresponding, for example, to a pressure in the inlet manifold of the engine and to a temperature. The computer controls the actual ignition circuit 6.

Under given operating conditions (for example of speed and pressure) the computer defines a number of pulses. Starting from the passage of the reference mark in front of the detector 1 (pip) a corresponding number of pulses coming from the tachometer 2 is counted and the ignition is triggered with a delay (relative to the pip) corresponding to a determined angle.

It should however be noted that a magnitude z, for example the ignition advance, depends empirically on two other magnitudes, for example the speed of the engine and the pressure in the inlet manifold of the engine, x and y respectively. Together these coordinate points x, y, z form a surface corresponding to the operating points of the engine.

In the memory of the digital computer 3 a certain number of values z are recorded, each corresponding to a pair of discrete digital values x, y, which together form an address. It is rare that the operation point of the engine will correspond exactly to an x, y address at which there is a discrete value of z stored. More often, the operating conditions of the engine will produce values of x and y which will lie between two discrete x, y addresses, and an interpolation method is generally employed to obtain the value for z. This entails a certain approximation of the result. The interpolation method used here consists in splitting up a measured value, for example x into a "whole" part $x_i$ composed of the most significant bits (of high order) and a "fractional" part $R_j$ (bits of low order) which is a remainder which is never erased and which is carried over to the following measurement.

Within the scope of the invention the procedure comprises sampling at a determined frequency. On each sampling, measurements are made and for each point the "whole" parts and "remainders" of the coordinates x and y are determined. Between two measurements, a certain number of memory addressing operations (x, y) are effected, so that after a few addressing operations the mean value will correspond substantially to the real value for x and y. This value in fact tends towards the real value and may even coincide therewith. The complete arrangement functions in "pursuit" of the result. This result is given by the mean of the values obtained at the output of the computer matrix.

However, as the measurement is changed, the previous measurements become less significant than the last. In the pursuit phenomenon it is therefore expedient for the weight of the address transmission which are already close to the result (all they do is to confirm it) to be attenuated relatively quickly in respect of time. On the other hand, when there is a considerable deviation, it is expedient to attenuate more slowly with respect to time. If the "result" value available is designated $S_i^*$ and the value of the last address transmission is designated $S_i$, the following recurrence formula is substituted for the formula of the mean:

$$S_i^* = S_{i-1}^* \cdot (1 - 1/n) + S_i$$

n being a number and $(1-1/n)$ being the attenuation factor.

The successive transmissions are therefore attenuated regularly, starting from their rank. The less they differ from one another, the more rapid this attenuation will be.

This result is obtained with a circuit of the kind shown in FIG. 2a. The matrix output of the memory 2.0 of the computer 3 is for example in the form of a number $S_i$ comprising 8 bits, of which only the first 6 are, for example, retained as being the most significant. Let $X_i$ be the result obtained: $X_i = S_i/q$, where q is a division factor. As 2 bits were left behind, in the example considered, q=4.

$S_i$ has arrived at memory 2.0, $X_i$ appears at the matrix output lines 2.4, and this number is addressed to the input 2.6 of a subtracter 2.5. On its other input 2.7 the subtracter 2.5 receives the most significant bits, equal in number to those in $X_i$, from the output of a double-mode reversible counter 2.8. The result of the subtraction (in practice its complement) is addressed to the load input 2.19 of a preselection counter 2.20.

The value of this number is obtained from $X_i$ and $S^*/n$, if $S^*$ designates the content of the counter 2.8 and n the shift factor. For example, the output of 2.8 here comprises 12 bits, and a shift of 6 is taken, thus giving $n = 2^6 = 64$. The number addressed at 2.19 is therefore:

$$X_i - \frac{S^*}{n} = \frac{S_i}{q} - \frac{S_{i-1}^*}{n}$$

if it is agreed to apply the designation $S_{i-1}*$ to the contents of reversible counter 2.8 at the moment of a loading operation.

Furthermore, the sign of the result of the subtraction—received at the output 2.10 of the subtracter 2.10—is addressed via the device 2.25 to the mode input of the reversible counter 2.8. If this sign is positive, counter 2.8 functions in the "forward count" mode, while if the sign is negative it functions in the "backward count" mode. The circuit 2.25 is of the buffer store or 1-bit latch type and its output is addressed to the mode input 2.12 of the counter 2.8 transcribes the sign (high or low) existing at 2.10 at the moment of the loading of the preselection counter 2.20.

After a loading, preselection counter 2.20 receives clock pulses via a gate 2.13 at its counting input. As long as all the outputs of 2.20 are not high, the output of 2.15 (NAND gate) is high, so that the clock pulses applied to one of the inputs of 2.13 are transmitted to preselection counter 2.20 and reversible counter 2.8 (at input 2.9). All the outputs of 2.20 then become high, thus giving rise to the appearance at 2.16, via the gate 2.15, of a pulse which brings about: the reloading of 2.20 with the new result of the subtracter (load input of 2.20), the application at input 2.12 of the reversible counter of the new sign at 2.10 (transfer input of 2.25), the appearance at 2.14 of the said pulse (the possible utilization of which will be seen later on), and finally, via NAND gate 2.13, the blocking during these operations of the counting at 2.20 and 2.8. Although in principle all these logical operations are instantaneous, in practice, particularly in the case the output pulse at of utilization of 2.14, an operating time must in fact be provided (generally 2 clock pulses) with the aid of a device which is not necessary for understanding and which is not illustrated.

From everything that has been said above it is clear that between two successive loadings of preselection counter 2.20, reversible counter 2.8 has received via gate 2.13 a number of pulses equal to the load of 2.20, that is to say at its output the total number displayed has passed from:

$S_{i-1}^*$ to $S_i^*$ where $$S_i^* = S_{i-1}^* + (\frac{S_i}{q} - \frac{S_{i-1}^*}{n})$$

the last term being taken with its sign via 2.12.

The 8 most significant bits of $S_i*$ are utilized. The result is:
$R_i = S_i*/p$, p being the value of the power of 2 of the shift (here $12 - 8 = 4$, thus giving $p = 2^4 = 16$), whence:

$$R_i = R_{i-1}(1 - \frac{1}{n}) + \frac{S_i}{p.q.}$$

To seek the "stable" value (constant input) of $R_i$ $$R_i(1 - 1 + \frac{1}{n}) = \frac{S_i}{pq}$$

$$R_i = \frac{n}{pq} S_i$$

In the example taken, where
$p = 16, q = 4, n = 64,$

* this gives $R_i = S_i$. This is quite "normal", because $S_i$ and $R_i$ are expressed by the same number of bits.

The least significant bits ($Y_o$ and $Y_1$) from memory 2.0 are addressed to one of the inputs of a second "subtracter" 2.1, to the other input of which the two associated bits of $R_i$, here outputs a and b of reversible counter 2.8 are addressed. The subtraction result at 2.29 is applied to the input of the device 2.24, the sign being addressed via line 2.30 to the same device. The latter device 2.24 also receives at 2.17 the pulses coming from junction 2.16 at the output 2.14. it serves the following purpose: if at inputs 2.30 of device 2.24 there exists a number d (here between 0 and 3), it transmits at one output (here there are two) a high signal d times out of four (four because there are here two bits), the "times" being timed by the pulses arriving at 2.17. There are two outputs at 2.3, and one or the other of them gives the result depending on the sign (high or low) at 2.30. The signal at 2.3 is addressed to the borrow input of 2.5, either as positive borrow (add 1 to the value at 2.6) or as negative borrow (add 1 to the value at 2.7). The result of this is that if there is a deviation between $R_i$ and $S_i$ relating to the least significant bits, for example 1 (that is to say ¼ in relation to the base unit) the device will add 1 (algebraically) once out of four times to the result 2.5. It may be observed that this makes it possible for the desired speed to be increased in a certain ratio (here 4).

With the device shown in FIG. 2a the "desired" result is always available at $R_i$, and the method is "coherent". Also, this number can be used even during its variations and during the determination of an advance. Also, a plurality of counters and therefore a plurality of power circuits (multicylinder engines) can be controlled, even simultaneously.

The arrangement proposed is the most rapid possible in respect of the counting method, because all the time, except what has been said regarding the reloading and transfer time, is used for correcting $R_i$. This introduces the variable attenuation of the weight of the transmissions, the desired air, during the time.

Another method "by counting" as shown in FIG. 2b would include replacing counting by load cycle of 2.20 by a multiplication method utilizing a binary rate multiplier 2.91 fed at its coding inputs by the output of the subtracter and at its clock input by a fixed frequency H. The variable output frequency, modulated by the result of the subtraction, coming from the binary rate multiplier 2.91 feeds the clock input of a reversible counter 2.8, whose mode is also controlled by the sign of the result of the subtracter 2.5. A diagrammatical view of a system of this kind is shown in FIG. 2b, without a detailed description being given.

FIG. 3a shows how addressing of the computer memory 2.0 is effected with unerased carry, as described in the previously mentioned earlier patents.

A timing device diagrammatically represented at 3.0, for example, recalls the method in the case of interpolation on speed, and supplies the following signals. First at 3.01 a generally high signal which, via the gate 3.1, is applied to and enables the tachometer pulses to reach the counter 3.3 and, beyond the latter, the counter serially connected 3.4. Periodically, at the measuring frequency, this signal interrupts the counting. During the interruption device 3.0 addresses by means of its output 3.02 a transfer signal to the input 3.6 latch 3.5, which produces at its output 3.7 what existed at the output of counter 3.4 at the moment of the transfer. This value constitutes the address, more precisely the fraction of address relating to speed. Finally, after and during the interruption device 3.0 effects via 3.03 the zeroing of the counter 3.4 and not that of the counter 3.3.

Carry operation is thus certainly obtained, but at the measurement frequency. The sampling frequency supplied by the timing device can be linked to the interpolation frequency, thus permitting economy of means, as shown in the previously mentioned patents.

In certain cases this economy is not justified, and FIG. 3b shows a means of disconnection of the interpolation frequency within the framework of the fundamental method of variable address transmissions, unrelated to the measurement frequency.

The element 3.0 functions as in the case of FIG. 3a, but it also effects the transmissions of a transfer signal to a buffer store or latch 3.21, which did not exist in FIG. 3a, and it effects the zeroing of a counter 3.13 (serving the function of 3.3., which was not reset to zero).

Operation is as follows. As in the case of the previous arrangement of FIG. 3a, at the end of a measurement there is a transfer at latch 3.15 just as there was a transfer at 3.5, 3.15 being a latch like 3.5. Until the following transfer the sub-address $x_i$ thus exists at the output of 3.15.

Counter 3.13 is also reset to zero on each measurement, at the end of the measurement the value $a_x$ (least significant bits) exists at the output of 3.13, and after transfer, and until the following transfer takes place (measurement period), this value persists at the output of the latch 3.21. The counter 3.13 continues to count after being reset to zero, and at any moment its output shows a number between 0 and 7 (here it has been assumed that the counter is a 3-bit counter, which is obviously not a limitation). The output of the latch 3.21 is addressed to the input of an adder 3.22. To the other input of 3.22 are addressed the outputs of the AND gates 3.23 (here represented by a series of NAND gates and inverters). The input 3.30 of these gates is generally low, so that the adder 3.22 generally effect $(a_x+0)=a_x<8$. The total carry $\geq 8$ of this addition is addressed to the borrow input of the adder 3.24.

When a transmission is needed for example, if at the matrix output a circuit of the type shown in FIG. 2 is used this moment is that of the low output pulse 2.14, a high signal is addressed at 3.30. It is for that reason that it has been marked 2.14.

At that moment 3.22 adds to $a_x$ a practically random magnitude the value at the momemt at the output of 3.13, and this has the result that, since this number has the desired norm (here 3 bits), the probability of having a borrow addressed to adder 3.24 is proportional to $a_x$. If such an event occurs, the address fraction $x_i$ becomes $x_{i+1}$, and the desired result has been obtained.

If the element 2.25 has been placed in position it is generally sufficient to have "fugitive" transmissions, as is the case for example with the arrangement shown in FIG. 2a. If this is not the case, a latch will be placed between 3.24 and the memory address input.

If the transmissions are used "fugitively", for example for loading the counter 2.20 of FIG. 2a, the gates 3.30 are not necessary. The outputs of 3.13 are addressed direct to the second addition input of 3.22, so that the total always evolves from $a_x$ to $a_x+7$, and this has the result that the borrow probability, and therefore the probability of an address $x_{i+1}$ at a given moment, is proportional to $a_x$. The memory address evolves permanently, and sampling is effected by utilisation, that is to say for example by the loading of the preselection counter 2.20.

Between two measurements at 3.13, a certain number of transmissions can be made to the matrix of the computer, in order to effect the interpolations at each incidence of the pulse at 2.14. For this purpose, instead of the outputs of the counter 3.13 the output of a random number generator of known type is addressed to the gates 3.23.

On each new measurement at 3.13 the remainder is deleted.

It is thus possible to disconnect the frequency of the interpolations and the measurement frequency.

The examples described so far utilised a tachometer device of the type described in U.S. Pat. No. 3,946,709. Instead of a tachometer and an input counter it is equally well possible to utilise, between the input detectors and the matrix of the computer, a converter giving an output number whose most significant bits are addressed to latch 3.15 and the least significant to latch 3.21. At the output of the converter a measurement result is thus continuously available, and the procedure comprises interpolation at the frequency defined by the pulses at 2.14.

The advance control device according to the invention is particularly applicable to the ignition advance control of controlled ignition engines and for the injection control of diesel engines. The pulses coming from the tachometer correspond in fact to angles of rotation of the engine. When the number of these pulses corresponds to the number calculated by the interpolation method, either the ignition (for controlled ignition engines) or the injection (for diesel engines) is triggered.

I claim:

1. A digital advance control system for internal combustion engines comprising a digital computer which receives signals representative of operating parameters of the engine, a detector for measuring the speed of the engine and a tachometer device for supplying signals to the digital computer at a frequency which is a multiple of that produced by the detector, said computer having a memory and operating in response to the input data for addressing said memory and producing at an output thereof a group of bit signals corresponding to a number which is related to the number of signals from said tachometer device which corresponds to the ignition angle of the engine,
   a variable attenuation circuit coupled to the computer output, said circuit comprising:
   first subtracter means for receiving at one input thereof the higher order bits of said computer output,
   reversible counter means, the higher order bits of the output of said reversible counter means being supplied to another input of said first subtracter means,
   means for supplying clock pulses to said reversible counter means,
   second subtracter means for receiving and comparing the lower order bits of the computer output and of the reversible counter means, said second subtracter means including means for supplying to said first subtracter means digital signals defining a number and a sign for effecting the carry-over of borrows in dependence on its sign,
   preselection counter means having an input for receiving the output of said first subtracter means, the output of said preselection counter means controlling said means for supplying clock pulses to said reversible counter means.

2. A system according to claim 1 wherein said preselection counter means also receives the clock pulses and supplies a pulse every time it has completed its counting.

3. A system according to claim 1 wherein said addressing means receives the signals from said tachometer device and further comprises two adders, of which one determines borrows and transmits them to the other, said other adder addresses to the computer memory, at an interpolation frequency a number composed of the sum of the most significant bits of the numbers measured at its input and of any borrows.

4. A system according to claim 3, wherein the first adder receives on the one hand the least significant bits of the numbers measured at the input and on the other hand a random number.

5. A system according to claim 4, wherein the said random number is composed of the said least significant bits.

6. A system according to either of claims 2 or 3 wherein the pulse supplied by the preselection counter is applied to the addressing circuit for triggering the interpolation.

7. A digital advance control system for internal combustion engines comprising a digital computer which receives signals representative of operating parameters of the engine, a detector for measuring the speed of the engine and a tachometer device for supplying signals to the digital computer at a frequency which is a multiple of that produced by the detector, said computer having a memory and operating in response to the input data for producing at an output of said memory a group of bit signals corresponding to a number which is related to the number of signals from said tachometer device which corresponds to the ignition angle of the engine,
   a variable attenuation circuit coupled to the computer output to receive said bit signals, said circuit comprising:
   subtracter means for receiving at one input thereof the higher order bits of said group of signals from said computer output,
   reversible counter means, the higher order bits of the output of said reversible counter means being supplied to another input of said subtracter means,
   binary multiplier means having an input for receiving the output of said subtracter means,
   means for supplying clock pulses to an input of said binary multiplier means, the output of said binary multiplier means supplying clock pulses to said reversible counter means under the control of said subtracter means.

* * * * *